(12) United States Patent
Knappe

(10) Patent No.: US 9,130,859 B1
(45) Date of Patent: Sep. 8, 2015

(54) METHODS AND APPARATUS FOR INTER-VIRTUAL LOCAL AREA NETWORK MULTICAST SERVICES

(71) Applicant: JUNIPER NETWORKS, INC., Sunnyvale, CA (US)

(72) Inventor: Michael Knappe, Morgan Hill, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 157 days.

(21) Appl. No.: 13/853,426

(22) Filed: Mar. 29, 2013

(51) Int. Cl.
*H04L 12/761* (2013.01)
(52) U.S. Cl.
CPC ..................................... *H04L 45/16* (2013.01)
(58) Field of Classification Search
None
See application file for complete search history.

(56) References Cited

U.S. PATENT DOCUMENTS

| | | | |
|---|---|---|---|
| 2008/0198858 A1* | 8/2008 | Townsley et al. | 370/401 |
| 2013/0346564 A1* | 12/2013 | Warrick et al. | 709/219 |
| 2014/0214958 A1* | 7/2014 | Cheshire | 709/204 |

* cited by examiner

*Primary Examiner* — Charles C Jiang
*Assistant Examiner* — George Atkins, Jr.
(74) *Attorney, Agent, or Firm* — Cooley LLP

(57) ABSTRACT

A first access point is included in a first VLAN but not included in a second VLAN. The first access point is operatively coupled to a second access point that is included in the second VLAN but not included in the first VLAN. The second VLAN includes a multicast domain name system (mDNS) service that is not multicast to the first VLAN. The first access point is configured to receive an mDNS request for the mDNS service from a client device that is operatively coupled to the first VLAN. The first access point is configured to send, to the second access point, an encapsulated mDNS request that is based on the mDNS request from the client device such that a connection is established between the client device and a network device providing the mDNS service within the second VLAN.

17 Claims, 5 Drawing Sheets

METHODS AND APPARATUS FOR INTER-VIRTUAL LOCAL AREA NETWORK MULTICAST SERVICES

BACKGROUND

Some embodiments described herein relate generally to zero configuration networks and more particularly, to methods and apparatus for transmitting multicast domain name service packets between virtual local area networks.

In some instances such as, for example, in large campus or enterprise networks, it may be desirable to partition the network into multiple distinct broadcast domains or virtual local area networks (VLANs). In such instances, VLANs can greatly simplify network design regardless of the physical location of electronic devices (e.g., client devices and/or host devices) included therein. In some instances, it may be desirable to arrange a VLAN as a zero configuration network where a usable internet protocol (IP) such as, for example, a multicast Domain Name System (mDNS) service, can be automatically established without manual intervention by a user and/or administrator. In such instances, devices included in the VLAN can use an automated service discovery method to, for example, query for network services and/or to advertise network services to any other device(s) included in the VLAN via the mDNS protocol. In such instances, however, the mDNS protocol limits the network services to client devices and/or host devices on the same VLAN. Therefore, in some complex networks, the querying for and/or the advertising of network services by electronic devices across more than one VLAN is unavailable.

Thus, a need exists for improved methods and apparatus for inter-VLAN multicast service communication.

SUMMARY

Methods and apparatus for transmitting multicast domain name service packets between virtual local area networks (VLANs) are described herein. In some embodiments, a first access point is included in a first VLAN but not included in a second VLAN. The first access point is operatively coupled to a second access point that is included in the second VLAN but not included in the first VLAN. The second VLAN includes a multicast domain name system (mDNS) service that is not multicast to the first VLAN. The first access point is configured to receive an mDNS request for the mDNS service from a client device that is operatively coupled to the first VLAN. The first access point is configured to send, to the second access point, an encapsulated mDNS request that is based on the mDNS request from the client device such that a connection is established between the client device and a network device providing the mDNS service within the second VLAN.

DETAILED DESCRIPTION

In some embodiments, a first access point is included in a first virtual local area network (VLAN) but not included in a second VLAN. The first access point is operatively coupled to a second access point that is included in the second VLAN but not included in the first VLAN. The second VLAN includes a multicast domain name system (mDNS) service that is not multicast to the first VLAN. The first access point is configured to receive an mDNS request for the mDNS service from a client device that is operatively coupled to the first VLAN. The first access point is configured to send, to the second access point, an encapsulated mDNS request that is based on the mDNS request from the client device such that a connection is established between the client device and a network device providing the mDNS service within the second VLAN.

In some embodiments, a method includes receiving, from a first access point included in a first VLAN, an mDNS packet from a client device that is operatively coupled to the first VLAN. The mDNS packet is associated with a network service provided by a second VLAN. Based on the mDNS packet, a second access point included in the second VLAN is selected. Based on selecting the second access point and via the second access point, the mDNS packet is forwarded to a network device that is included in the second VLAN and that provides the network service.

In some embodiments, a non-transitory processor-readable medium includes code to cause a processor to receive, at a first access point included in a first VLAN, an mDNS advertisement for a network service from a network device that is included in the first VLAN. The code includes instructions to cause the processor to identify, based on the mDNS advertisement, a network controller. The code includes instructions to cause the processor to send, based on the identifying of the network controller and to the network device, an mDNS packet from a second access point that is included in a second VLAN via the network controller, the mDNS packet having been received by the second access point from a client device requesting the network service.

As used in this specification, the singular forms "a," "an" and "the" include plural referents unless the context clearly dictates otherwise. Thus, for example, the term "a client device" is intended to mean a single client device or a combination of client devices.

Figure 1:
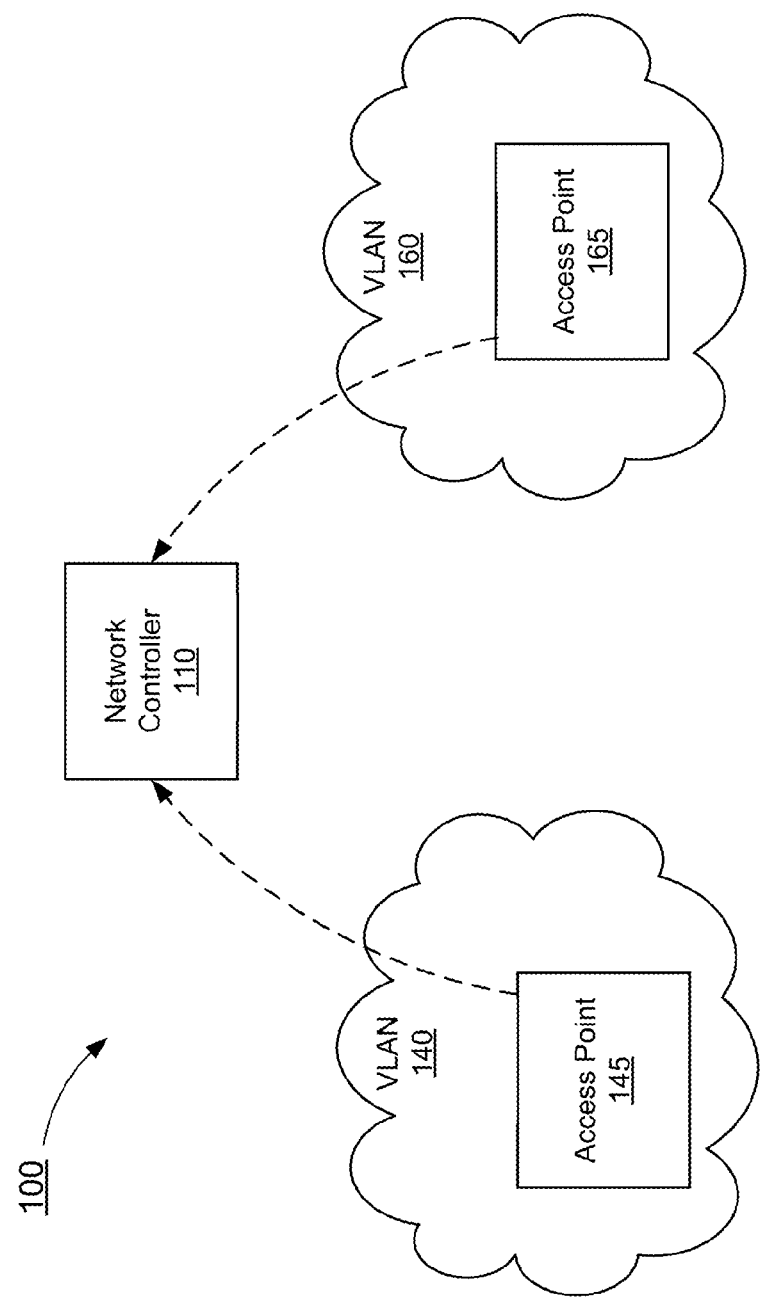
FIG. 1 is a schematic illustration of a network including a first virtual local area network and a second virtual local area network, according to an embodiment.

FIG. 1 is a schematic illustration of a network 100, according to an embodiment. The network 100 can be any network that enables data or data units (e.g., data packets, data cells, data frames, etc.) to be sent through, routed, switched, and/or forwarded within the network. In some embodiments, the network 100 shown in FIG. 1 can be, for example, an enterprise network, a large campus network, or the like. In such a network, any network node (e.g., access point) included in the network can be controlled by one or more network controllers. In some instances, the network 100 can be a converged network having the functionalities of both a wireless network (e.g., a wireless local area network (WLAN)) and a wired network (e.g., an Ethernet). In some instances, the network 100 can be a wide area network (WAN) that can be used to connect any number of local area networks (LANs) and/or virtual local area networks (VLANs).

The network 100 includes a network controller 110 that is operably coupled to a first access point 145 included in a first virtual local area network (VLAN) 140 and to a second access point 165 included in a second VLAN 160. The network controller 110 included in the network 100 can be a single device that combines, for example, the functionality of a switch, a router, and a controller. In some instances, a network controller 110 in the network 100 can be referred to as a core SRC (switch, router, and controller). In some instances, the network controller 110 can be a layer-2 and/or a layer-3 (of the seven-layer Open Systems Interconnect (OSI) model of networking) switch or router. As described in further detail herein, the network controller 110 can be configured to receive an encapsulated data unit from an access point of a VLAN included in the network 100 (e.g., the first access point 145 of the first VLAN 140) and route the data unit to an access point of another VLAN (e.g., the second access point 165 of the second VLAN 160) included in the network 100.

Figure 2:
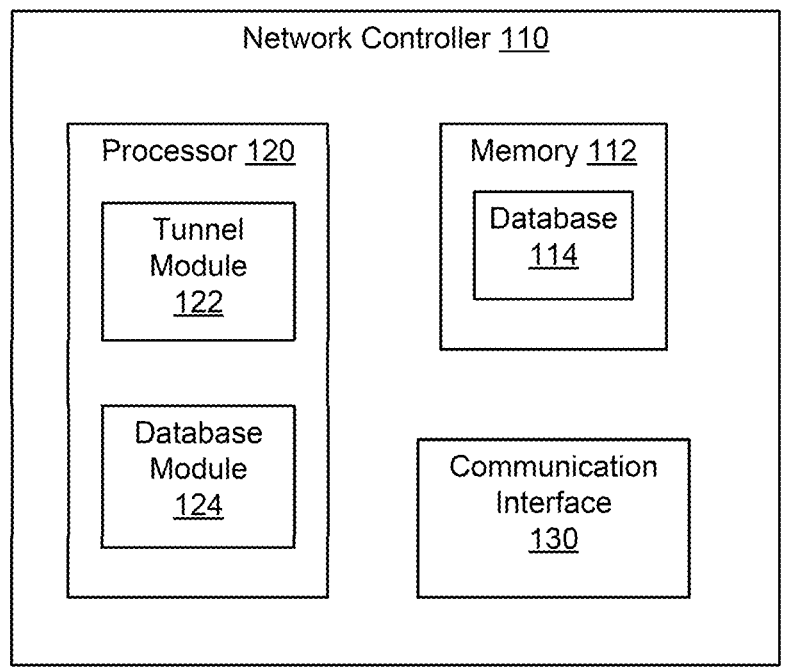
FIG. 2 is a schematic illustration of a network controller included in the network of FIG. 1.

As shown in FIG. 2, the network controller 110 includes at least a memory 112, a processor 120, and a communication interface 130. The memory 112 can be, for example, a random access memory (RAM), a memory buffer, a hard drive, an erasable programmable read-only memory (EPROM), an electrically erasable read-only memory (EEPROM), a read-only memory (ROM), a flash memory, and/or so forth. The memory 112 can store instructions to cause the processor 120 to execute modules, processes and/or functions associated with the control and/or operation of the network controller 110. By way example, the memory 112 can store instructions that can be executed by the processor 120 associated with routing a data unit (e.g., a data cell, data frame, data packet, etc.).

A module can be, for example, any assembly and/or set of operatively-coupled electrical components, and can include, for example, a memory, a processor, electrical traces, optical connectors, software (executing in hardware), and/or the like. For example, a module executed in the processor can be any combination of hardware-based module (e.g., a field-programmable gate array (FPGA), an application specific integrated circuit (ASIC), a digital signal processor (DSP)) and/or software-based module (e.g., a module of computer code stored in memory and/or executed at the processor 220) capable of performing one or more specific functions associated with that module.

The memory 112 can contain a table or database 114 that can store information regarding active network sessions and node management between the network controller 110 and, for example, the VLANs 140 and 160. Such a table or database 114 can contain information pertaining to network sessions such as, for example, a port number associated the access point 145 of the first VLAN 140 involved in a network communication session. In some instances, the database 114 can store a MAC address of the first access point 145 and any client device included in the first VLAN 140, and/or a MAC address of the second access point 165 and any client device included in the second VLAN 160. The database 114 can further store, for example, information associated with a time duration of a network session, an amount of bandwidth consumed by a network session, the IP and/or MAC address of the network controller 110, the port number of the network controller 110 in the network session with an access point, and/or the like. As described in further detail herein, the database 114 can be, for example, a route table that is maintained with one or more VLAN source/destination bidirectional tunnels such that a data unit (e.g., a multicast data unit as described below) can be routed and/or forwarded therebetween.

The processor 120 can be, for example, a general purpose processor, a Field Programmable Gate Array (FPGA), an Application Specific Integrated Circuit (ASIC), a Digital Signal Processor (DSP), and/or the like. The processor 120 can be configured to run and/or execute application processes and/or other modules, instructions, processes and/or functions associated with the network controller 110. The processor 120 includes a tunnel module 122 and a database module 124. The tunnel module 122 can execute application processes and/or other modules, instructions, processes and/or functions associated with establishing and maintaining a tunnel such as, for example, a multicast Domain Name Service (mDNS) tunnel, an Ethernet-over-layer-3 tunnel such as a Control and Provisioning of Wireless Access Points (CAPWAP) tunnel, a Multiprotocol Label Switching (MPLS) tunnel, and/or the like. For example, the tunnel module 122 can route incoming and/or outgoing mDNS data units passing from the first access point 145 of the VLAN 140 to the second access point 165 of the second VLAN 160 via a tunnel defined the network controller 110, as described in further detail herein.

The database module 124 of the processor 120 can execute application processes and/or other modules, instructions, processes, and/or functions associated with monitoring and/or updating the database 114 included in the memory 112. For example, in some embodiments, the network controller 110 can receive a data unit (e.g., an mDNS request and/or service advertisement) from the first access point 145 included in the first VLAN 140 and can match the data unit against an established destination access point (e.g., the access point 165 of the second VLAN 160) included in the database 114.

The communication interface 130 of the network controller 110 can be any suitable device, component, and/or module that can establish a communication between the network controller 110 and a network (e.g., the network 100). For example, the communication interface 130 can be a network interface card (NIC) or the like. In some embodiments, the communication interface 130 can place the network controller 110 in communication with the network 100 via a wireless connection. Thus, the communication interface 130 can include, for example, a radio frequency transceiver to communicate via Wi-Fi® or the like. In some instances, the communication interface 130 can place the network controller 110 in communication with the network 100 via a wired connection (e.g., an Ethernet connection). In this manner, the communication interface 130 can include any number of ports (not shown in FIGS. 1 and 2) configured to receive, for example, an Ethernet cable to form a wired connection with a device included in the network 100 (e.g., the first access point 145 and the second access point 165).

In some instances, the network controller 110 can establish a wired/wireless session with one or more VLANs (e.g., the VLANs 140 and 160). The network controller 110 can be positioned upstream of the VLANs 140 and 160 of the network 100 to connect the VLANs 140 and 160 to another network (e.g., the Internet or the like). In this manner, the network controller 110 can send, forward, and/or route downstream traffic received from any other network (not shown in FIG. 1) to the VLAN 140 and/or the VLAN 160, and/or send, forward, and/or route upstream traffic received from the VAN 140 and/or the VLAN 160 to any other network. As described in further detail herein, the network controller 110 can also be configured to send, forward, and/or route traffic (e.g., a data unit flow) such as, for example, multicast Domain Name System (mDNS) traffic between the first VLAN 140 and the second VLAN 160.

In the network 100, the first VLAN 140, and/or the second VLAN 160 can include multiple devices (e.g., any number of user devices, access nodes, or the like). In some instances, a communication session associated with the first VLAN 140 or the second VLAN 160 can be identified by, for example, a virtual group identifier that is uniquely designated to that VLAN. Specifically, each data unit (e.g., data packet, data cell, data frame) from a communication session of the first VLAN 140 (e.g., destined to and/or sent from a device of the VLAN 140) can include a virtual group identifier or otherwise can be associated with the virtual group identifier that is included in the data unit. As a result, for example, the access point 145 and/or the network controller 110 can determine, based on the virtual group identifier included in the data unit, that the data unit is associated with the first VLAN 140. Similarly, each data unit from a communication session of the second VLAN 160 can include a virtual group identifier or otherwise can be associated with the virtual group identifier that is included in the data unit. As a result, the access point 165 and/or the network controller 110 can determine, based on the virtual group identifier included in the data unit, that the data unit is associated with the second VLAN 160.

In some instances, the network 100 can be arranged such that the first VLAN 140 is a first broadcast domain and the second VLAN 160 is a second broadcast domain, independent of the first VLAN 140. In such instances, the first access point 145 and the second access point 165 can be designated as anchoring or insertion points for the VLANs 140 and 160, respectively. Specifically, the first access point 145 can be designated as, for example, a master device for the first VLAN 140, and second access point 165 can be designated as, for example, a master device for the second VLAN 160.

In some instances, the first VLAN 140 and the second VLAN 160 can be, for example, zero configuration networks. Said another way, the first VLAN 140 can employ a set of network processes such as, for example, service discovery, address assignment, hostname resolution, and/or the like that are local to the first VLAN 140. Similarly, the second VLAN 160 can employ a similar set of network processes. Thus, devices such as, for example, printers, computers, network storage drives, media servers, and/or the like, and services that the devices offer can be located on or within the VLAN (e.g., the VLAN 140 or the VLAN 160) using, for example, a multicast Domain Name System (mDNS) service that can be local to that VLAN. By using an mDNS service, communication between network devices on a VLAN can be established without a Domain Name System (DNS) server. For example, in some instances, a client device (e.g., a laptop) included in the first VLAN 140 can send a mDNS service request to the access point 145 and, based on the mDNS request, the access point 145 can send a response to the client device that is associated with the mDNS service from a second client device (e.g., a media server) included in the first VLAN 140. Moreover, in some instances, data units that are sent to an access point using mDNS and having a destination that is outside of the VLAN are often discarded.

In some instances, however, it may be desirable to provide a network service included on, for example, the second VLAN 160 to a client device (not shown in FIG. 1) that is operably coupled to the first VLAN 140. In such instances, the access points 145 and the 165, and the network controller 110 can be arranged to define a source/destination bidirectional tunnel. Furthermore, with the first access point 145 configured as a control access point of the first VLAN 140 and with the second access point 165 configured as a control access point of the second VLAN 160 (as described above), the first access point 145 and the second access point 165 can be configured to store, for example, a list of network services associated with an mDNS service.

For example, in some instances, a client device (e.g., a printer, a media server, a computer, etc.) included on or in the second VLAN 160 can be configured to provide an mDNS service. In such instances, that client device can be configured to send an advertisement associated with the mDNS service to the second access point 165, which can, in turn, send an indication of the available service to the network controller 110 and/or the first access point 145. In some instances, a client device (e.g., a media server, printer, or the like) included in the first VLAN 140 can be configured to send an mDNS service request (e.g., associated with the mDNS service provided by the client device included on the second VLAN 160) to the first access point 145. The first access point 145 can receive the mDNS service request and can use, for example, a 5-tuple flow table to store, at least temporarily, the request. In some instances, the mDNS service request and/or subsequent packet flow can be placed in a quarantine queue or the like. For example, quarantining the mDNS request and/or subsequent packet flow can include storing the mDNS request and/or packet flow without discarding it. Thus, the data packet is isolated from a flow of other data packets through the first access point 145. In this manner, the first access point 145 can further process the quarantined mDNS packet flow to identify the specific mDNS service being requested. With the data packet associated with the mDNS service request quarantined and processed, the first access point 145 can identify and/or match the service type of the mDNS service request to the list of network services stored by the first access point 145 (as described above).

With the mDNS service request identified as being associated with a device in the second VLAN 160, the first access point 145 can be configured to encapsulate the mDNS service request. For example, in some instances, the mDNS service request can be a layer-2 packet (on the OSI model) and the first access point 145 can encapsulate the mDNS service request as a layer-3 packet. In other embodiments, an access point can encapsulate the mDNS service request using any suitable method. In still other embodiments, the mDNS service request need not be encapsulated. Once encapsulated, the first access point 145 can forward the encapsulated packet to the network controller 110. Expanding further, the arrangement of the first access point 145 and the network controller 110 is such that the first access point 145 can send the signal to the network controller 110 substantially without routing (e.g., without a destination). As described above, the network controller 110 can include the database 114 in the memory 112 that can include a route table or the like. Thus, the network controller 110 can receive the encapsulated mDNS service request packet and can match it against a list of destination VLANs and/or access points. In this manner, the network controller 110 can determine the destination (e.g., the second access point 165 of the second VLAN 160) of the encapsulated mDNS service request based on the information stored in the database 114 and can establish a connection between the first access point 145 of the first VLAN 140 and the second access point 165 of the second VLAN 160.

Figure 3:
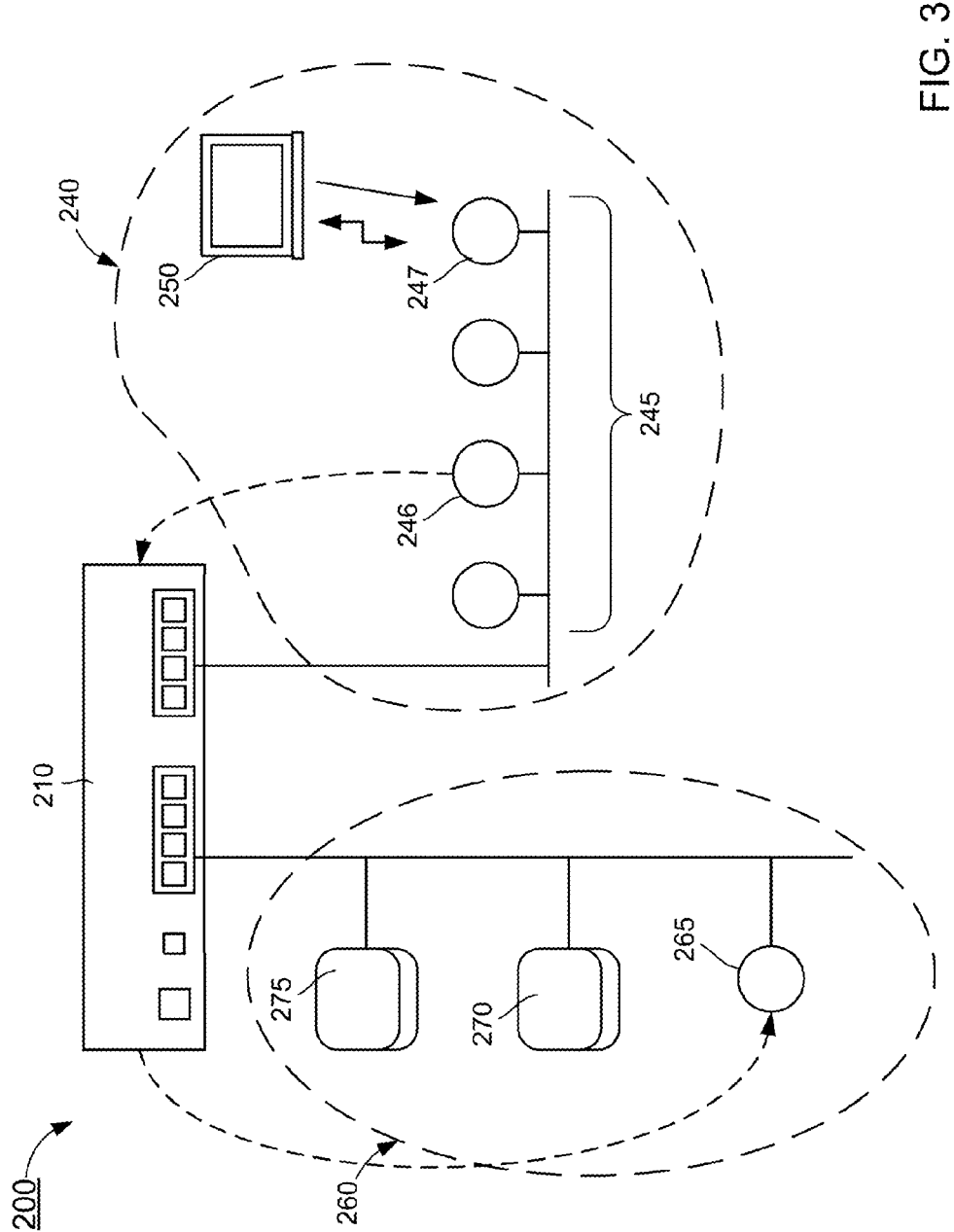
FIG. 3 is a schematic illustration of a network including a first virtual local area network and a second virtual local area network, according to another embodiment.

FIG. 3 is an illustration of a network 200 according to another embodiment. The network 200 can be any suitable network such as, for example, those described above with reference the network 100 of FIG. 1. Therefore, aspects of the network 200 are not described in further detail herein. The network 200 includes a network controller 210 that is in communication with a first VLAN 240 and a second VLAN 260. The network controller 210 can be substantially similar to the network controller 110 shown and described above with reference to FIGS. 1 and 2. In this manner, the network controller 210 can include at least a processor, a memory, and a communication interface. As described in further detail herein, the network controller 210 can be configured to receive an encapsulated data unit from an access point of a VLAN (e.g., an access point of the first VLAN 240) and route the data unit to an access point of another VLAN (e.g., an access point of the second VLAN 260), or vice versa.

The network controller 210 can establish a wired/wireless session with one or more VLANs (e.g., the VLANs 240 and 260). The network controller 210 can be positioned upstream of the VLANs 240 and 260 of the network 200 to connect the VLANs 240 and 260 to another network (e.g., the Internet or the like). In this manner, the network controller 210 can send, forward, and/or route downstream traffic received from any other network (not shown in FIG. 2) to the VLAN 240 and/or the VLAN 260, and/or send, forward, and/or route upstream traffic received from the VAN 240 and/or the VLAN 260 to any other network. As described in further detail herein, the network controller 210 can also be configured to send, forward, and/or route traffic such as, for example, multicast Domain Name System (mDNS) traffic between the first VLAN 240 and the second VLAN 260.

In the network 200, the first VLAN 240 and/or the second VLAN 260 can include multiple devices (e.g., any number of client devices, access nodes, or the like). For example, as shown in FIG. 3, the first VLAN 240 can include a set of access points 245 having a control access point 246 and a client device 250 in communication with an access point 247 that is included in the access points 245 and that is other than the control access point 246. The second VLAN 260 can include a first client device 270 and a second client device 275 that are each in communication with an access point 265. The access point 265 of the second VLAN 260 can be operably coupled to the network controller 210 (e.g., via a wired or wireless connection). In some instances, a communication session associated with the first VLAN 240 or the second VLAN 260 can be identified by, for example, a virtual group identifier that is uniquely designated to that VLAN. Specifically, each data unit (e.g., data packet, data cell, data frame) from a communication session of the first VLAN 240 (e.g., destined to and/or sent from a device of the VLAN 240) can include or otherwise be associated with the virtual group identifier that is included in the data unit, as described above.

In some instances, the network 200 can be arranged such that the first VLAN 240 is a first broadcast domain and the second VLAN 260 is a second broadcast domain, independent of the first VLAN 240. In such instances, the control access point 246 and the access point 265 can be designated as anchoring or insertion points for the VLANs 240 and 260, respectively. Specifically, the control access point 246 can be designated as, for example, a master device for the first VLAN 240, and access point 265 can be designated as, for example, a master device for the second VLAN 260.

A described above, the first VLAN 240 and the second VLAN 260 can be, for example, zero configuration networks. Said another way, the first VLAN 240 can employ a set of network processes such as, for example, service discovery, address assignment, hostname resolution, and/or the like that are local to the first VLAN 240. Similarly, the second VLAN 260 can employ a similar set of network processes. Thus, devices such as, for example, printers, computers, network storage drives, media servers, and/or the like, and services that the devices offer can be located on or within the VLAN (e.g., the VLAN 240 or the VLAN 260) using, for example, a multicast Domain Name System (mDNS) service that can be local to that VLAN, as described in detail above.

In use, the control access point 246 of the first VLAN 240, the access point 265 of the second VLAN 260 and the network controller 210 can be arranged to define a source/destination bidirectional tunnel that can be used to send an mDNS packet flow between the first VLAN 240 and the second VLAN 260. In this network 200, with the control access point 246 configured as a master access point of the first VLAN 240 and with the access point 265 configured as a master access point of the second VLAN 260 (as described above), the control access point 246 and the access point 265 can be configured to store, for example, a list of network services associated with an mDNS service.

For example, in some instances, the client devices 270 and 275 included on or in the second VLAN 260 can be configured to provide an mDNS service. In some instances, the client devices 270 and 275 can be configured to send an advertisement associated with the mDNS service to the second access point 265, which can, in turn, send an indication of the available mDNS service to the network controller 210. For example, in some embodiments, the client devices 270 and 275 can be a media server or the like. In other embodiments, the client devices can be a printer, a network storage device, and/or any other suitable device.

In some instances, the client device 250 (e.g., a laptop, a personal computer (PC), a tablet, a smart phone, a personal digital assistant (PDA), etc.) included in the first VLAN 240 can be configured to send a mDNS service request to the access point 247 that is associated with the mDNS service provided by the client device 270 and/or 275 included on the second VLAN 260. The access point 247 can receive the mDNS service request and can use, for example, a 5-tuple flow table to store, at least temporarily, the request. In some instances, the mDNS service request and/or subsequent packet flow can be placed in a quarantine queue or the like. Thus, the data packet is isolated from a flow of other data packets through the access point 247. With the data packet associated with the mDNS service request quarantined at the access point 247, the access point 247 can send a signal to the control access point 246 associated with the quarantined data packet. The control access point 246 can, in turn, identify and/or match the service type of the mDNS service request to the list of network services stored by the control access point 246 (as described above).

With the mDNS service request identified, the access point 247 can send the data packet to the control access point 246. Upon receiving the data packet from the access point 247, the control access point 246 can encapsulate the mDNS service request. For example, in some instances, the mDNS service request can be a layer-2 packet (on the OSI model) and the control access point 246 can encapsulate the mDNS service request as a layer-3 packet. Once encapsulated, the control access point 246 can forward the encapsulated packet to the network controller 210. Expanding further, the arrangement of the control access point 246 and the network controller 210 is such that the control access point 246 can send the signal to the network controller 210 substantially without routing (e.g., without a destination). The network controller 210 can receive the encapsulated mDNS service request packet and can match the encapsulated mDNS service packet against a list of destination VLANs and/or access points stored, for example, in a database and/or route table. For example, in some instances, a system administrator or the like can establish a list of predetermined control paths and/or tunnels between the first VLAN 240 and the second VLAN 260 associated with sending an mDNS data packet therebetween. Said another way, in some instances, a system administrator or the like can establish a route table or the like that can include a list of control paths between any number of VLANs based, at least in part, on a list of mDNS services.

With the client devices 270 and 275 advertising an mDNS service, the network controller 210 can determine the destination of the encapsulated mDNS service request, based on the information stored in a database and/or route table (e.g., similar to the database 114 described above with reference to FIG. 1) and can establish a connection between the control access point 246 of the first VLAN 240 and the access point 265 of the second VLAN 260. By designating the control access point 246 of the first VLAN 240 as the master (e.g., the insertion access point), a predefined tunnel (e.g., connection) between the first VLAN 240 and the second VLAN 260 can be established via the network controller 210. Moreover, in some instances, an mDNS response can be sent from the second VLAN 260 to the first VLAN 240 in a similar manner as the request. In such instances, the network controller 210 can send the encapsulated mDNS response to the control access point 246. Thus, the control access point 246 can decapsulate the mDNS response and, in some instances, can route the decapsulated mDNS response to the access point 247 to allow the client device 250 to access the mDNS response.

In some instances, the connection between the first VLAN 240 and the second VLAN 260 can be used to make the mDNS services provided by the client devices 270 and 275 on the second VLAN 260 to any number of communication sessions on the first VLAN 240. For example, in some instances, a second client device (not shown) included in the first VLAN 240 can be operatively coupled to any of the access points 245 and can be configured to send an mDNS service request (for the same service as the client device 250) to that access point. In such instances, the access point operatively coupled to the second client device can quarantine the mDNS service data packet and the control access point 246 can identify and/or match the service type of the mDNS service request to the list of network services stored by the control access point 246. Thus, with the connection established between the control access point 246 of the first VLAN 240 and the access point 265 of the second VLAN 260, the control access point 246 can be configured to provide the second client device with access to the mDNS by routing the mDNS service to the access point to which the second client device is connected.

Figure 4:
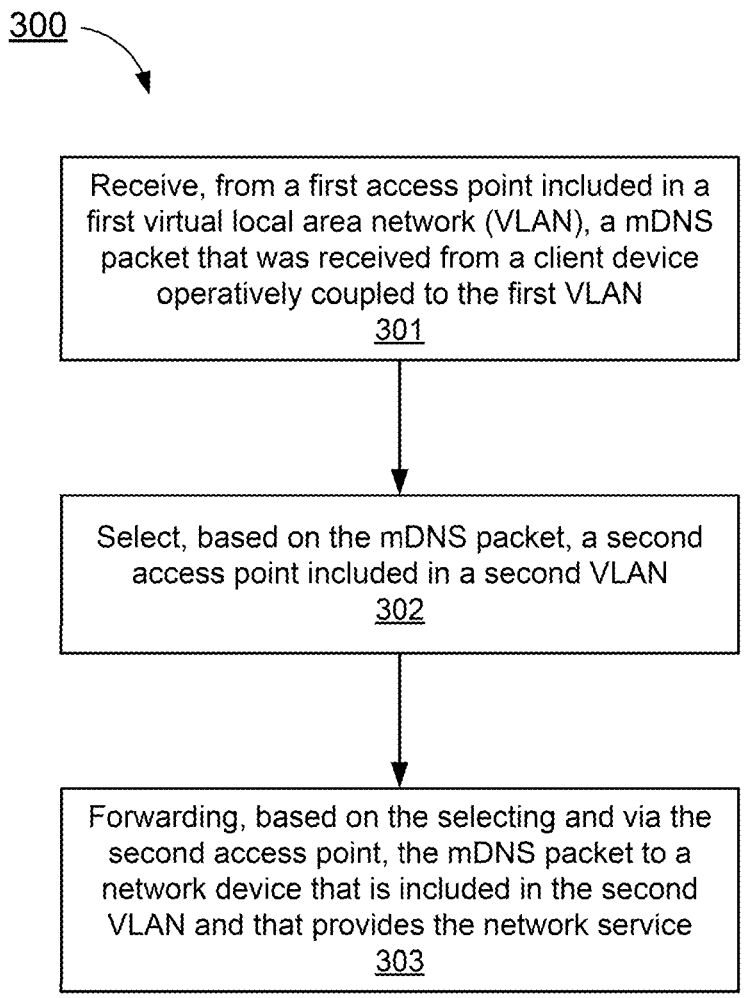
FIG. 4 is a flow chart illustrating a method of inter-virtual local area network multicast service communication, according to an embodiment.

FIG. 4 is a flow chart illustrating a method 300 of inter-virtual local area network (VLAN) multicast service communication, according to an embodiment. In some embodiments, the method 300 includes receiving, from a first access point included in a first VLAN, a multicast Domain Name System (mDNS) packet that was received from a client device operatively coupled to the first VLAN, at 301. For example, in some embodiments, the first VLAN and the second VLAN can be operably coupled via any suitable network such as the network 100 described above with reference to FIG. 1. In this manner, the first VLAN and the second VLAN can each be zero configuration networks. In some embodiments, the client device can be, for example, a personal computer (PC), a laptop, a tablet, a smart phone, etc. In some instances, the mDNS packet can be a request for an mDNS service included in the second VLAN.

Based on the mDNS packet, a second access point included in the second VLAN is selected, at 302. For example, in some embodiments, a client device included in the second VLAN can be configured to provide an mDNS service (e.g., a media server, a printer, and/or the like). In such embodiments, the client device can send an mDNS packet associated with an advertisement of the mDNS to the second access point. In some instances, the second access point can broadcast the advertisement. In this manner, the first access point included in the first VLAN can select the second access point included in the second VLAN. Based on the selecting and via the second access point, the mDNS packet is forwarded to a network device (e.g., the client device) that is included in the second VLAN and that provides the network service, at 303.

In some embodiments, the first access point and the second access point can each be operably coupled to a network controller such as, for example, the network controller 110 described above with reference to FIG. 1. In such embodiments, the network controller can be configured to define a control path and/or tunnel between the first access point of the first VLAN and the second access point of the second VLAN. For example, in some embodiments, the network controller can include a route table or the like that can be used to route the mDNS packet. Moreover, in some instances, the first access point can forward the mDNS packet to the network controller substantially without routing (e.g., without a defined destination). In such instances, the network controller can route the mDNS packet based, at least in part, on the route table. In some instances, the forwarded mDNS packet can be encapsulated prior to being forwarded. For example, in some instance, the mDNS packet can be a layer-2 (e.g., a data-link layer) packet and the first access point can encapsulate the mDNS packet to form a layer-3 encapsulated mDNS packet.

Figure 5:
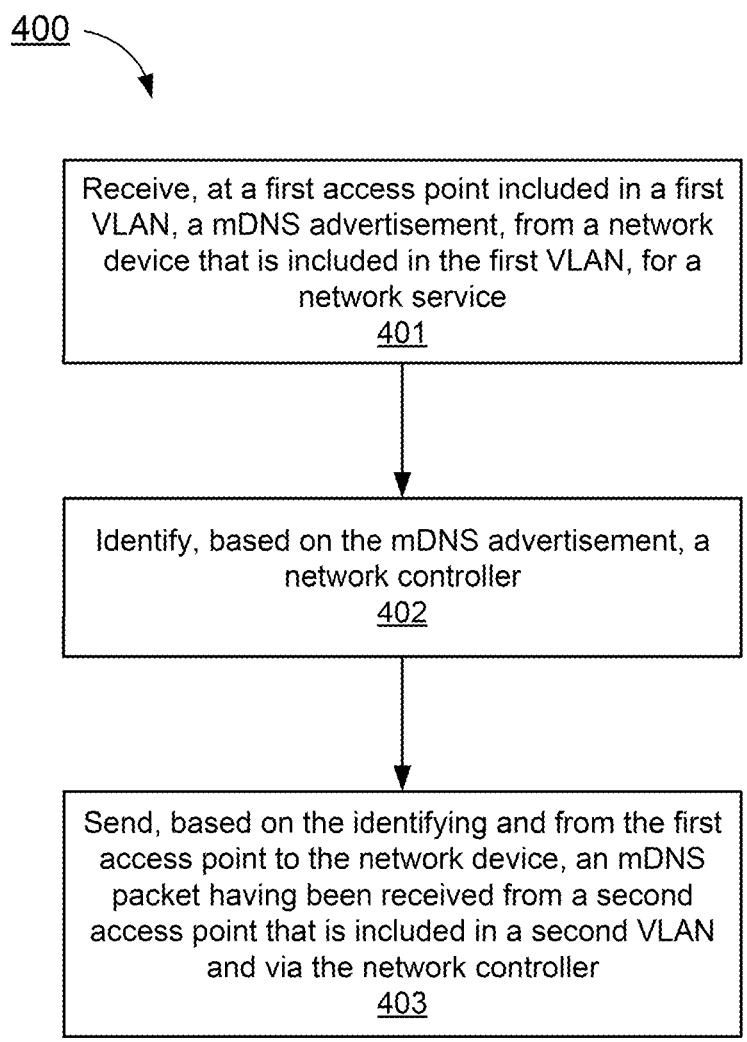
FIG. 5 is a flow chart illustrating a method of inter-virtual local area network multicast service communication, according to another embodiment.

FIG. 5 is a flow chart illustrating a method 400 of inter-virtual local area network (VLAN) multicast service communication, according to another embodiment. In some embodiments, the method 400 includes receiving, at a first access point included in a first VLAN, a multicast Domain Name System (mDNS) advertisement, from a network device that is included in the first VLAN, for a network service, at 401. For example, in some embodiments, the first VLAN and a second VLAN can be operably coupled via any suitable network such as the network 100 described above with reference to FIG. 1. In this manner, the first VLAN and the second VLAN can be, for example, zero configuration networks. In some embodiments, the network device can be a multimedia streaming device, a printer, a network storage device, etc. In some instances, the first access point can broadcast the mDNS advertisement.

Based on the mDNS advertisement, a network controller is identified, at 402. For example, the network controller can be any suitable network controller such as, for example, the network controller 110 described above with reference to FIG. 1. Based on the identifying and from the first access point to the network device, an mDNS packet is sent from a second access point that is included in the second VLAN and via the network controller, at 403. The mDNS packet can be received by the second access point from a client device requesting the network service. In some embodiments, the client device can be, for example, a personal computer (PC), a laptop, a tablet, a smart phone, etc.

In some instances, the network controller can be configured to define a control path and/or tunnel between the first access point of the first VLAN and the second access point of the second VLAN. For example, in some embodiments, the network controller can include a route table or the like that can be used to route the mDNS advertisement and/or the mDNS packet. In some instances and in response to the mDNS packet, the network device can send an mDNS response to the first access point, which can, in turn, forward the mDNS response to the network controller substantially without routing (e.g., without a defined destination). In such instances, the network controller can route the mDNS response based, at least in part, on the route table. In some instances, the forwarded mDNS response can be encapsulated prior to being forwarded. For example, in some instance, the mDNS response can be a layer-2 (e.g., a data-link layer)

packet and the first access point can encapsulate the mDNS response packet to form a layer-3 encapsulated mDNS response packet.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a first access point configured to be (1) included in a first virtual local area network (VLAN) and not included in a second VLAN and (2) operatively coupled to a second access point that is included in the second VLAN and not included in the first VLAN, the second VLAN including a multicast domain name system (mDNS) service that is not multicast to the first VLAN,
the first access point configured to receive an mDNS request for the mDNS service from a client device that is operatively coupled to the first VLAN,
the first access point configured to place the mDNS request in a quarantine queue,
the first access point configured to send, in response to the mDNS request being placed in the quarantine queue, a signal to the second access point such that the second access point determines the availability of the mDNS service on the second VLAN,
the first access point configured to, in response to an indication from the second access point that the mDNS service is available on the second VLAN, define an encapsulated mDNS request,
the first access point configured to send, to the second access point, the encapsulated mDNS request, based on the mDNS request, such that a connection is established between the client device and a network device providing the mDNS service within the second VLAN.

2. The apparatus of claim 1, wherein:
the first access point is configured to receive the mDNS request from the client device via a third access point included in the first VLAN.

3. The apparatus of claim 1, wherein the mDNS request is a layer-2 packet and the encapsulated mDNS request is a layer-3 packet.

4. The apparatus of claim 1, wherein the second VLAN is a Zero configuration network.

5. The apparatus of claim 1, wherein:
the first access point is configured to send the encapsulated mDNS request to the second access point via a network controller that includes a routing table indicating a control path between the first access point and the second access point.

6. The apparatus of claim 1, wherein the first access point is configured to send the encapsulated mDNS without routing.

7. The apparatus of claim 1, wherein the mDNS service is a printing service.

8. A method, comprising:
receiving, from a first access point included in a first virtual local area network (VLAN), a multicast domain name system (mDNS) packet that was received from a client device operatively coupled to the first VLAN, the mDNS packet associated with a network service provided by a second VLAN, the mDNS packet having been placed in a quarantine queue at the first access point after being received from the client device, the mDNS packet having been released from the quarantine queue upon receipt, by the first access point, of an indication of an availability of the network service;
selecting, based on the mDNS packet, a second access point included in the second VLAN; and
forwarding, based on the selecting and via the second access point, the mDNS packet to a network device that is included in the second VLAN and that provides the network service.

9. The method of claim 8, further comprising defining a control path between the first access point and the second access point for the network service.

10. The method of claim 8, wherein the network service is a multimedia streaming service.

11. The method of claim 8, further comprising receiving the mDNS packet from the first access point that was received from the client device via a third access point included in the first VLAN.

12. The method of claim 8, wherein forwarding the mDNS packet to the network device includes forwarding the mDNS packet based on a routing table.

13. A non-transitory processor-readable medium storing code representing instructions to be executed by a processor, the code comprising code to cause the processor to:
receive, at a first access point included in a first virtual local area network (VLAN), a multicast domain name system (mDNS) advertisement, from a network device that is included in the first VLAN, for a network service;

identify, based on the mDNS advertisement, a network controller; and send, to the network controller and in response to an mDNS packet having been placed in a quarantine queue at a second access point that is included in a second VLAN, a signal indicative of an availability of the network service; and send, based on the identifying and from the first access point to the network device, the mDNS packet having been received from the second access point and via the network controller, the mDNS packet having been received by the second access point from a client device requesting the network service.

14. The non-transitory processor-readable medium storing code representing instructions to be executed by a processor of claim 13, the code further comprising code to cause the processor to forward, without routing, an mDNS response to the network controller, the mDNS response having been defined by the network device in response to the mDNS packet.

15. The non-transitory processor-readable medium storing code representing instructions to be executed by a processor of claim 13, the code further comprising code to cause the processor to send, to the network controller, a signal such that the network controller defines a control path between the first access point and the second access point.

16. The non-transitory processor-readable medium storing code representing instructions to be executed by a processor of claim 15, wherein the control path is a layer-3 control path and the mDNS packet is a layer-2 packet.

17. The non-transitory processor-readable medium storing code representing instructions to be executed by a processor of claim 13, wherein the first VLAN is a Zero configuration network.

* * * * *